United States Patent
Taheny et al.

(10) Patent No.: US 10,415,395 B2
(45) Date of Patent: Sep. 17, 2019

(54) METHOD FOR COOLING A GAS TURBINE AND GAS TURBINE FOR CONDUCTING SAID METHOD

(71) Applicant: ANSALDO ENERGIA SWITZERLAND AG, Baden (CH)

(72) Inventors: Oliver Joseph Taheny, Zürich (CH); Sven Olmes, Windisch (CH); Armin Busekros, Zürich (CH); Carlos Simon-Delgado, Baden (CH); Daniel Jemora, Villnachern (CH); Christophe Simonet, Ennetbaden (CH); Luca Alberti, Niederrohrdorf (CH); Eugenio Rossi, Nussbaumen (CH)

(73) Assignee: Ansaldo Energia Switzerland AG, Baden (CH)

( * ) Notice: Subject to any disclaimer, the term of this patent is extended or adjusted under 35 U.S.C. 154(b) by 432 days.

(21) Appl. No.: 15/154,322

(22) Filed: May 13, 2016

(65) Prior Publication Data
US 2016/0333700 A1     Nov. 17, 2016

(30) Foreign Application Priority Data
May 15, 2015   (EP) .................................... 15167859

(51) Int. Cl.
*F01D 5/18*    (2006.01)
*F01D 5/08*    (2006.01)
(Continued)

(52) U.S. Cl.
CPC ............... *F01D 5/18* (2013.01); *F01D 5/082* (2013.01); *F01D 5/084* (2013.01); *F01D 5/087* (2013.01);
(Continued)

(58) Field of Classification Search
CPC . F01D 5/08; F01D 5/081; F01D 5/082; F01D 5/084; F01D 5/085; F01D 5/087;
(Continued)

(56) References Cited

U.S. PATENT DOCUMENTS

| 2,970,437 | A | * | 2/1961 | Anderson | F02C 7/12 60/39.08 |
| 3,742,706 | A |   | 7/1973 | Klompas  |                    |
| 5,134,844 | A | * | 8/1992 | Lee      | F01D 5/08 415/116  |
| 5,174,105 | A |   | 12/1992 | Hines   |                    |

(Continued)

FOREIGN PATENT DOCUMENTS

| EP | 1 533 473 A1 | 5/2005 |
| EP | 1 921 255 A2 | 5/2008 |

(Continued)

OTHER PUBLICATIONS

Search Report dated Nov. 16, 2015, by the European Patent Office for Application No. 15167859.

*Primary Examiner* — Scott J Walthour
(74) *Attorney, Agent, or Firm* — Buchanan Ingersoll & Rooney PC

(57) ABSTRACT

A method is disclosed for cooling a gas turbine having a turbine, wherein a rotor, which rotates about a machine axis, carries a plurality of rotating blades, which are mounted by blade roots and extend with their airfoils into a hot gas path of the gas turbine. The rotor is concentrically surrounded by a turbine vane carrier carrying a plurality of stationary vanes, whereby the rotating blades and the stationary vanes are arranged in alternating rows in axial direction. An extended lifetime with external cooling is achieved by providing first and second cooling systems for the turbine.

5 Claims, 6 Drawing Sheets

(51) Int. Cl.
*F02C 7/18* (2006.01)
*F01D 25/12* (2006.01)
*F02C 7/12* (2006.01)

(52) U.S. Cl.
CPC ............... *F01D 25/12* (2013.01); *F02C 7/12* (2013.01); *F02C 7/18* (2013.01); *F05D 2220/32* (2013.01); *F05D 2240/12* (2013.01); *F05D 2240/15* (2013.01); *F05D 2240/30* (2013.01); *F05D 2260/14* (2013.01); *F05D 2260/20* (2013.01); *F05D 2260/231* (2013.01)

(58) Field of Classification Search
CPC . F01D 5/088; F01D 5/18; F01D 25/12; F02C 7/12; F02C 7/18; F05D 2260/20; F05D 2260/231; F05D 2260/14
See application file for complete search history.

(56) References Cited

U.S. PATENT DOCUMENTS

| | | | | |
|---|---|---|---|---|
| 5,611,197 | A | * | 3/1997 | Bunker .................. F02C 7/185 415/115 |
| 5,735,671 | A | | 4/1998 | Brauer et al. |
| 2005/0111964 | A1 | | 5/2005 | Krammer et al. |
| 2008/0112791 | A1 | * | 5/2008 | Lee .......................... F01D 9/065 415/58.4 |
| 2008/0112793 | A1 | * | 5/2008 | Lee .......................... F01D 5/082 415/115 |
| 2010/0124483 | A1 | | 5/2010 | Weaver et al. |
| 2012/0060507 | A1 | | 3/2012 | King et al. |
| 2012/0134778 | A1 | * | 5/2012 | Khanin ................... F01D 5/084 415/115 |

FOREIGN PATENT DOCUMENTS

| | | |
|---|---|---|
| FR | 2 174 497 A7 | 10/1973 |
| GB | 2 251 657 A | 7/1992 |
| WO | WO 2010/057182 A1 | 5/2010 |

* cited by examiner

METHOD FOR COOLING A GAS TURBINE AND GAS TURBINE FOR CONDUCTING SAID METHOD

BACKGROUND OF THE INVENTION

The present invention relates to the technology of gas turbines. It refers to a method for cooling a gas turbine according to the preamble of claim 1.

It further relates to a gas turbine for conducting such method.

PRIOR ART

In a gas turbine (GT) the physical limitations imposed by the conditions at blade one (first row of rotating blades) of the turbine requires the air to be at a pressure in excess of hot gas path pressures. Current solutions take high pressure air from the compressor and cool it with an external cooler ensuring the air temperature suffices to maintain the lifetime of the rotor at the heavily loaded blade fir trees (blade roots) while maintaining a large enough pressure to exceed hot gas conditions. The additional cooler is a disincentive to customers requiring Simple-Cycle operation due to the associated costs/maintenance.

The pressure and temperature at blade one of the turbine section of a GT engine define the physical limits of the cooling systems used to ensure required metal temperatures. A large pressure difference is required to drive the cooling of the rotor at the turbine in order to avoid hot gas ingestion while providing blade fir tree cooling. High pressure air is typically higher in temperature than low pressure air. In order to meet the temperature requirements of the rotor this air is passed through a cooler to lower the temperature, maintaining the required high pressure, and is subsequently employed to cool the rotor.

Thus there is a need for a cooling scheme, which on the one hand negates the requirement of a cooler, and on the other hand provides air of sufficient temperature to cool the rotor while maintaining the cooling requirements of the blades/vanes and turbine vane carrier (TVC).

In the past, a turbine blading for a gas turbine engine has been proposed (U.S. Pat. No. 3,742,706) includes a dual source of turbine cooling airflow wherein a portion of the high pressure compressor discharge airflow is directed to cool the most critical temperature areas of the turbine blade and a portion of the low pressure compressor interstage airflow is directed to cool the less critical temperature areas of the same turbine blade.

This patent is focused on optimizing the efficiency of a gas turbine engine through selective use of compressor cooling air for the blades only. It is detailed how there is a difference in cooling requirements at the leading and cooling edges, and said patent focuses on an embodiment that enables two sources per row of blades for the leading and cooling edges.

As such this patent requires that each blade is built to receive both sources of cooling air.

On the other hand, the patent is silent about the cooling of the hot gas path as a whole. And it is silent about cooling of the blades outside of the hot gas path.

SUMMARY OF THE INVENTION

It is an object of the present invention to provide a method for cooling a gas turbine, which optimizes the cooling of the hot gas path, specifically the blades and vanes, and the cooling of the rotor and the attachment of said blades to the rotor.

It is another object of the invention to provide a gas turbine for conducting said method.

The method according to the invention is provided for cooling a gas turbine, which comprises a turbine, wherein a rotor, which rotates about a machine axis, carries a plurality of rotating blades, which are mounted on said rotor by means of blade roots and extend with their airfoils into a hot gas path of said gas turbine, wherein said rotor is concentrically surrounded by a turbine vane carrier carrying a plurality of stationary vanes, whereby said rotating blades and said stationary vanes are arranged in alternating rows in axial direction.

It is characterized in that first and second cooling systems are provided for said turbine, whereby said first cooling system uses cooling air of a first pressure and first temperature and said second cooling system uses cooling air of a second pressure and second temperature substantially smaller than said first pressure and first temperature, and whereby said first cooling system is used to cool the airfoils of said rotating blades and said turbine vane carrier and said stationary vanes, and whereby said second cooling system is used to cool said rotor and said blade roots of said rotating blades in at least one row of said rotating blades.

According to an embodiment of the inventive method said blade roots of the first row of rotating blades are cooled by said second cooling system.

Specifically, said blade roots of at least the first and second row of rotating blades are cooled by said second cooling system.

According to another embodiment of the inventive method vane heat shields are provided on said rotor opposite to said stationary vanes, and that at least some of said vane heat shields are cooled by said second cooling system.

According to a further embodiment of the inventive method said gas turbine comprises a compressor with a plurality of compressor stages, which compressor compresses air for a combustion process and for cooling parts of said gas turbine, and that cooling air for said first cooling system is branched off at the exit of said compressor, while cooling air for said second cooling system is branched off at an intermediate compressor stage of said compressor.

Specifically, said compressor is driven by said rotor of said gas turbine, and that said branched-off cooling air for said first and second cooling system is conducted through said rotor in axial direction from said compressor to said turbine.

More specifically, said branched-off cooling air for said first and second cooling system is conducted through said rotor in separate low and high pressure cooling air channels, whereby said low pressure cooling air channel runs closer to said machine axis than said high pressure cooling air channel in radial direction.

Even more specifically, the cooling air for said second cooling system is subjected to a swirling action prior to being used to cool said blade roots.

The gas turbine according to the invention comprises a turbine and a multi-stage compressor, which have a rotor in common, which rotates about a machine axis.

It is characterized in that first and second cooling air channels run through said rotor from said compressor to said turbine, whereby said first cooling air channel runs from an intermediate compressor stage of said compressor to said turbine, while said second cooling air channel runs from the exit of said compressor to said turbine.

According to an embodiment of the inventive gas turbine said rotor carries within said turbine a plurality of rotating blades, which are mounted on said rotor by means of blade roots and extend with their airfoils into a hot gas path of said gas turbine, whereby said rotor is concentrically surrounded by a turbine vane carrier carrying a plurality of stationary vanes, whereby said rotating blades and said stationary vanes are arranged in alternating rows in axial direction, and whereby said first cooling air channel is connected to said blade roots of said rotating blades of at least one row of said rotating blades, while said second cooling air channel is connected to the airfoils of said at least one row of said rotating blades.

Specifically, said first cooling air channel runs closer to said machine axis than said high pressure cooling air channel in radial direction.

Specifically, a pre-swirler is provided in said second cooling air channel, where said second cooling air channel enters said turbine.

Specifically, said blade roots of at least two rows of said rotating blades are connected to said first cooling air channel by means of separate branches of said first cooling air channel.

Specifically, said first cooling air channel is connected to said blade roots of said rotating blades of the first row of said rotating blades, said second cooling air channel is connected to the airfoils of said rotating blades of said first row, and heat shields are provided on said rotor at the entrance of said turbine, and each of said heat shields has two separate flow paths, which connect said first and second cooling air channels to the blade roots and airfoils, respectively of said first row of rotating blades of said turbine.

Furthermore, a radial turbine may be provided between said first cooling air channel and said intermediate compressor stage of said compressor.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

Figure 1:
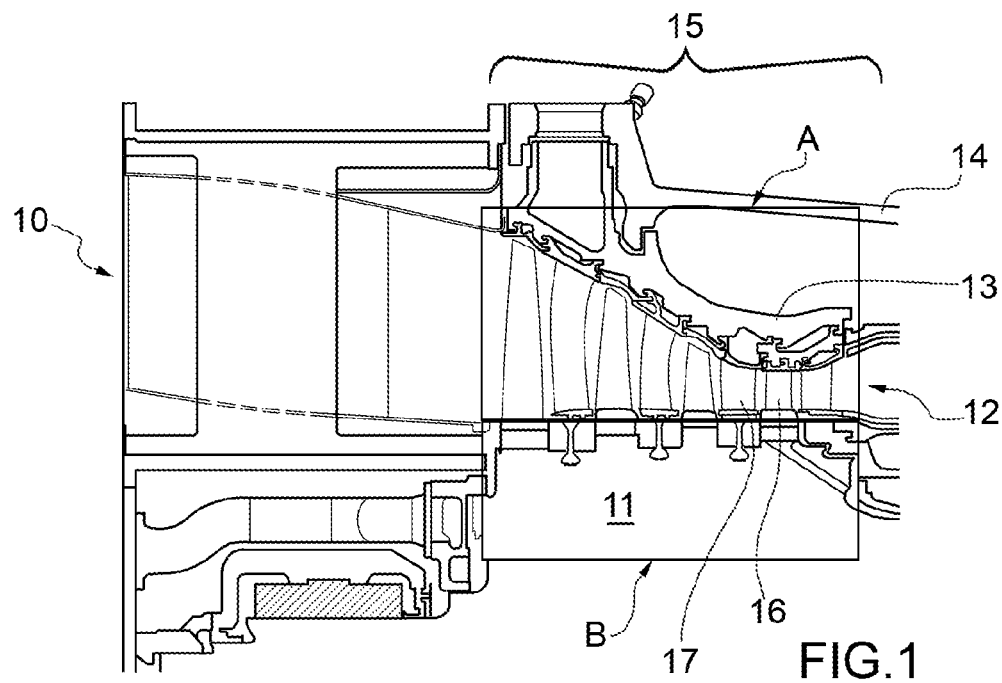
FIG. 1 shows part of a gas turbine with rows of rotating blades and stationary vanes, which are exposed to hot gas from an adjacent combustor and are cooled by a cooling scheme according to an embodiment of the invention.

As shown in FIG. 1, the present application focuses on the cooling within the turbine section 15 of a gas turbine engine 10, which is enclosed by a casing 14. The cooling is split into two distinct systems A and B: A high pressure cooling system A is used to feed the blades 16 and vanes 17 and the turbine vane carrier (TVC) 13. A low pressure cooling system B is isolated through high pressure seals from the high pressure cooling system A and the hot gas path through the turbine section 15.

Figure 2:
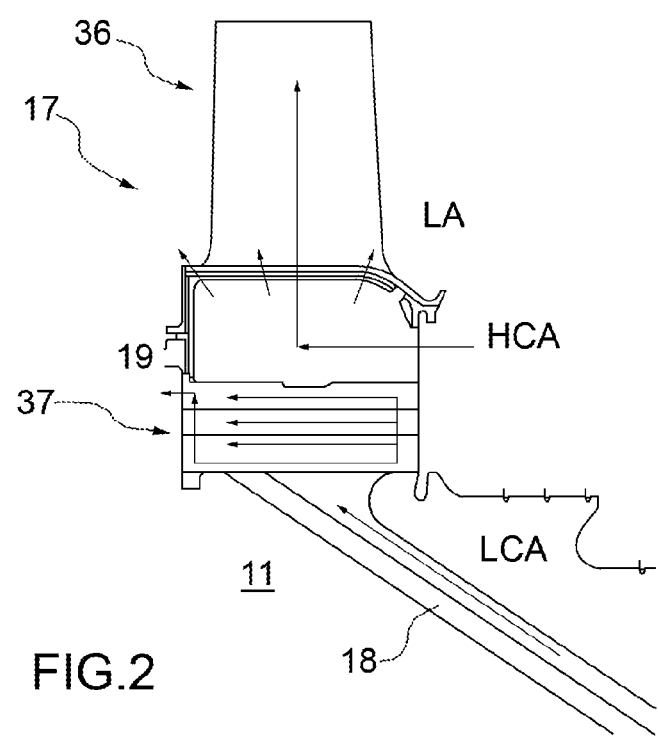
FIG. 2 shows a single rotating blade being cooled by two separate cooling air flows of different pressure and temperature according to an embodiment of the invention.

The low pressure cooling system B focuses on cooling the rotor 11 and the blade fir trees (blade roots 37 in FIG. 2). The rotor 11 and rotor fir trees 37 require low temperature air but do not require high pressure air. In contrast, the blades 16 and vanes 17, i.e. their airfoils 36 (FIG. 2), require high pressure air but are not as sensitive to the temperature of the air as the rotor 11. This system enables considerably more favourable operating conditions for the heavily loaded fir trees 37 of blades 16.

Figure 3:
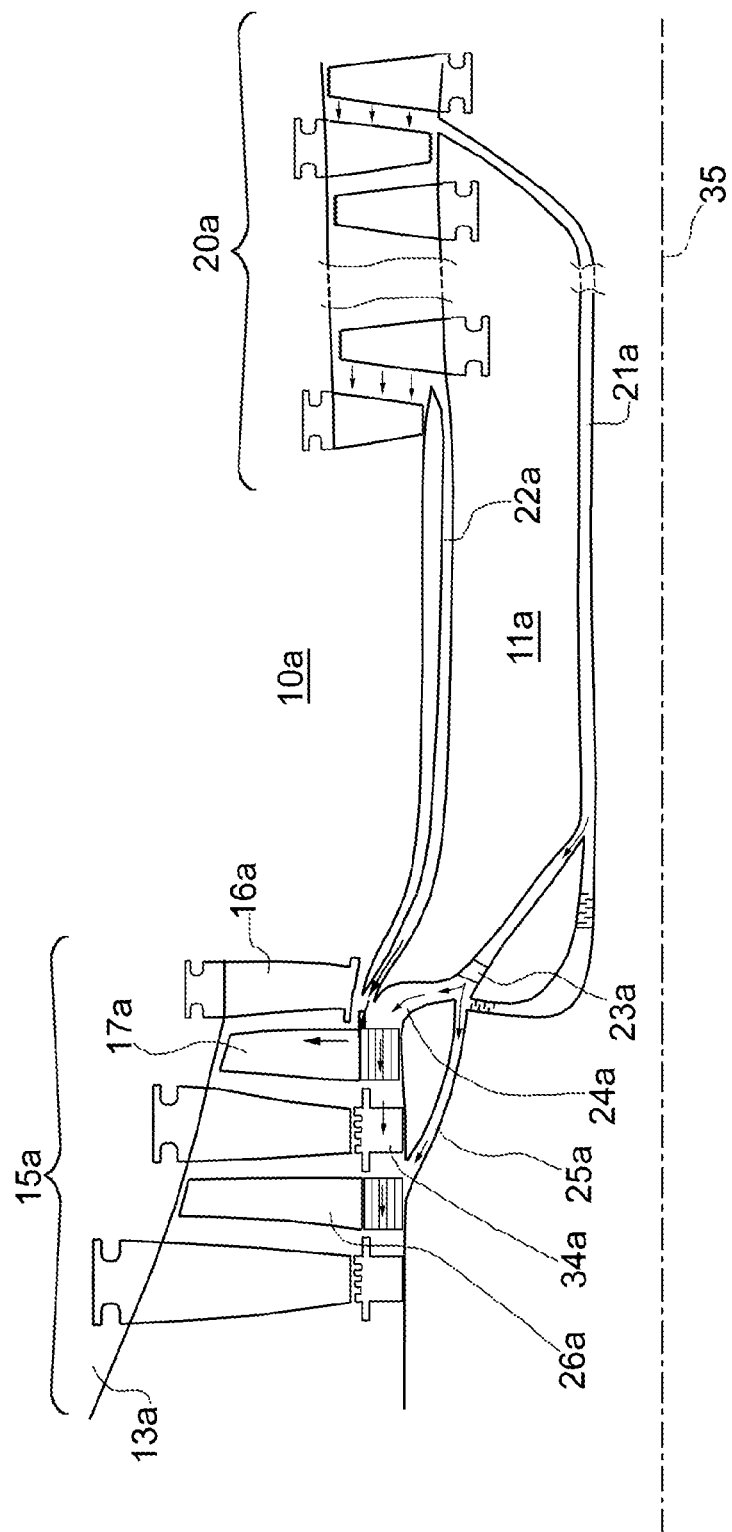
FIG. 3 shows a view of a divided cooling air supply from a compressor to the turbine according to an embodiment of the invention.

The respective cooling concept thus employs the primary high pressure air system (A) to cool the blades 16 (airfoils 36) and turbine vane carrier 13, with the inclusion of a secondary isolated cooling system (B) that pumps air of a lower temperature and pressure along the rotor core (11) to the turbine blade fir trees (37) and vane heat shields (e.g. 34a in FIG. 3).

FIG. 2 illustrates a detailed view of how the two systems are split at the blade level of a rotating blade 17. One system focuses on the blade airfoil 36 where high pressure cooling air HCA of higher temperature is introduced below the platform of the blade 17 and enters the airfoil 36 exits the blade as leakage air LA and is used for film cooling (high pressure), while the second system takes care of the temperatures within the rotor 11 and rotor fir trees (blade root 37) and receives low pressure cooling air LCA of lower temperature through a low pressure cooling air channel 18, which low pressure cooling air LCA exits through a cooling air vent 19.

FIG. 3 illustrates one embodiment of the proposed cooling scheme: Air, at a low pressure and temperature, is extracted from a compressor 20a of a gas turbine 10a at one of the earlier compressor stages, is subsequently passed through the rotor 11a in a low pressure cooling air channel 21a, reducing the temperature further due to the change in radius, and is directed towards the rotor turbine 15a and rotor turbine fir trees of rotating blades 17a (first row) and 26a (second row) through branches 24a and 25a after passing a pre-swirler 23a. In addition, heat shield 34a of second row vane is cooled by this air.

This cooling scheme enables fir tree survival under heavily loaded operating conditions. At the compressor end (20a), part of the (high pressure) air is directed through high pressure cooling air channel 22a, which is farer from machine axis 35 in radial direction than low pressure cooling air channel 21a, towards the blades 17a of the first row (blade one) and can be employed to prevent hot gas ingestion, or tuned to be of sufficient magnitude to have the focused job of cooling turbine blade one (its airfoil) entirely.

Figure 4:
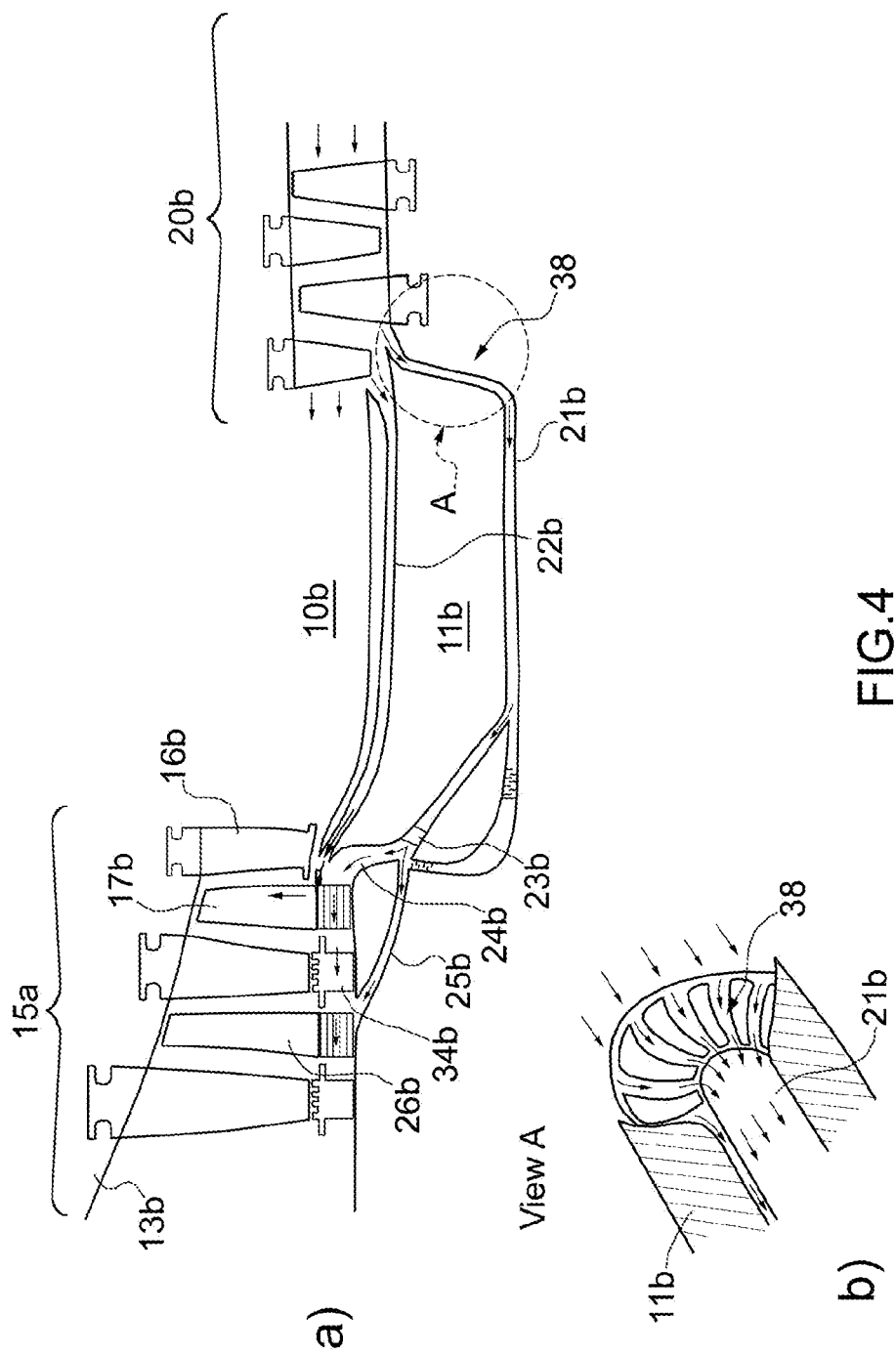
FIG. 4 shows—similar to FIG. 3—a view of a divided cooling air supply from a compressor to the turbine using a radial turbine (FIG. 4b) for the low temperature, low pressure flow according to another embodiment of the invention.

FIG. 4a illustrates a flow configuration in a gas turbine 10b similar to FIG. 3, taking air from the end of compressor 20b through a radial turbine 38 (FIG. 4b) to cool the rotor drum (11b) and turbine fir trees of first and second row blades 17b and 26b.

The change in radius and the radial turbine 38 reduce the fluid temperature and pressure of the air, which air cools the rotor drum (11b) and subsequently passes through a pre-swirler 23b before entering branches 24b and 25b and cooling the blade fir trees. The second flow path (high pressure cooling air channel 22b) takes air and prevents hot gas ingestion at vane one 16b and blade one 17b giving some redundancy to the seal in this location. This secondary flow could be tuned to have the focused job of cooling blade one 17b entirely.

Figure 5:
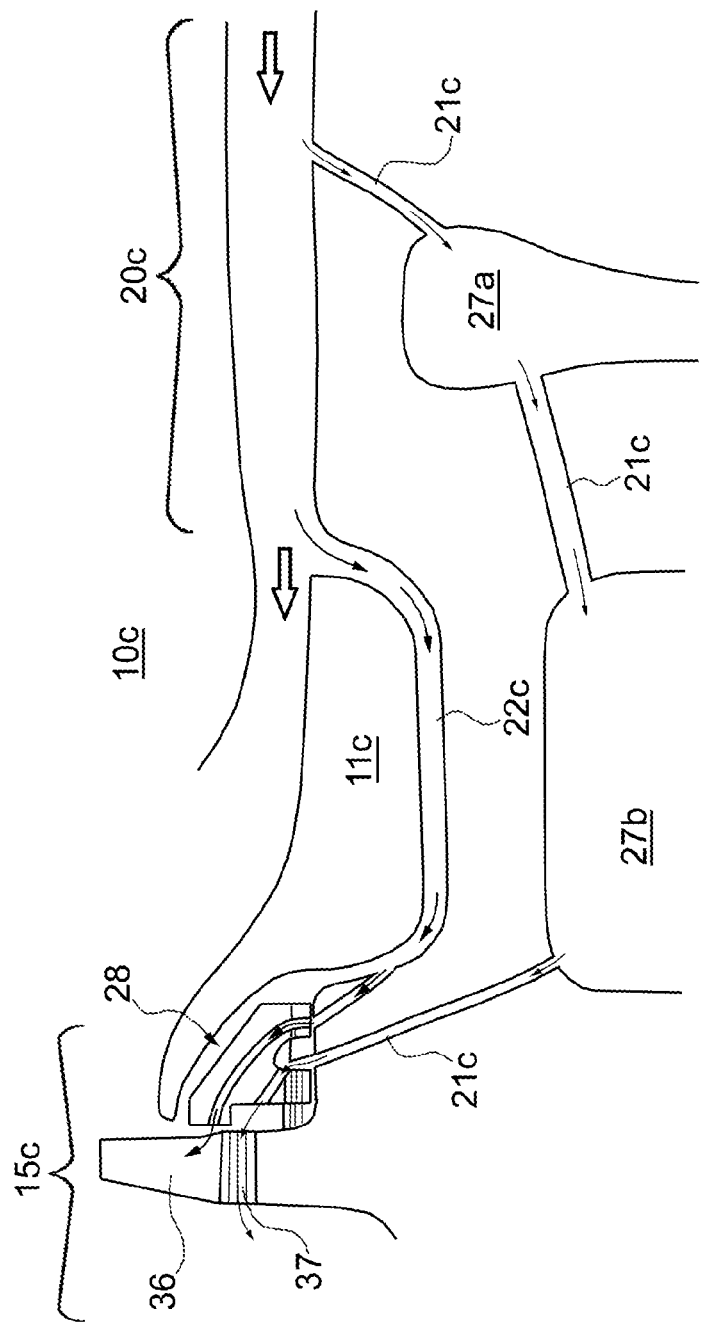
FIG. 5 shows the supply of both kinds of cooling air to the first row of rotating blades by means of a special heat shield upstream of said blades according to a further embodiment of the invention.

FIG. 5 illustrates a gas turbine 10c with compressor 20c and turbine section 15c with a cooling scheme similar to that of FIG. 3, but including a rotor heat shield 28 that is placed before the first blade of turbine 15c. High pressure cooling air is extracted at the end of compressor 20c and supplied to the heat shield 28 through high pressure cooling air channel 22c at rotor 11c. Low pressure cooling air flows from an earlier compressor stage through low pressure cooling air channel 21c and rotor cavities 27a,b to heat shield 28. Heat shield 28, which can be cast out of advanced materials reducing the weight, provides separate flow paths (31, 32 in FIG. 6b) for the high and low pressure cooling air flows so that the fir tree or blade root 37 and airfoil 36 of the first blade can be cooled separately.

Figure 6A:
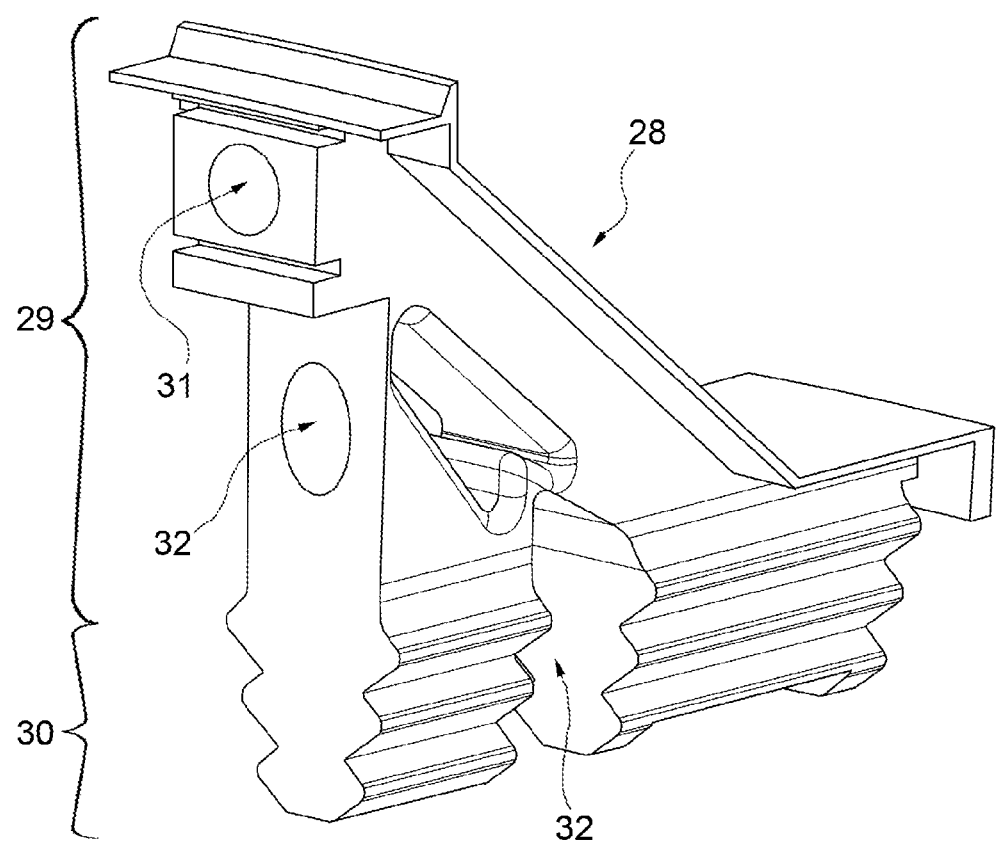
FIG. 6 shows in a perspective view (FIGS. 6a and 6c) the design of a heat shield according to FIG. 5, and the two separated cooling air paths within said heat shield (FIG. 6b).
Figure 6B:
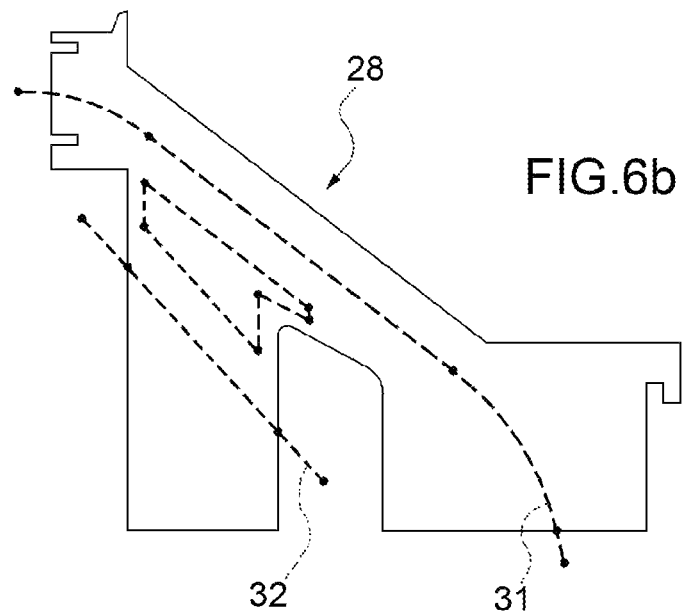
Figure 6C:
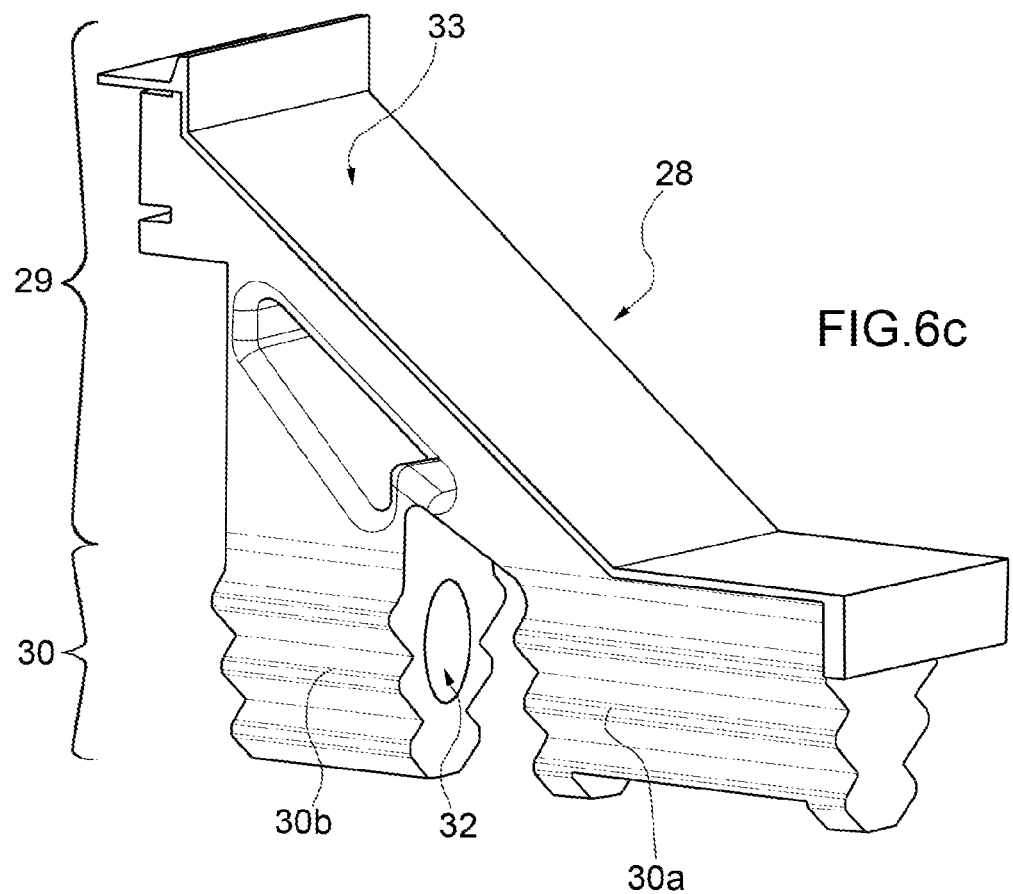

FIGS. 6a and 6c provide a more detailed look at one of the possible configurations of such a heat shield 28. The heat shield 28 is attached to the rotor (11c in FIG. 5) via a fir tree 30 in a fashion similar to the blade fixations. Above fir tree 30 a triangular body 29 with a slant 33 contains two bores or flow paths 31, 32 for the high pressure and low pressure cooling air, respectively. The fir tree 30 is axially divided into two parts 30a and 30b, which are separated by a gap. Through this gap the low pressure cooling air enters flow path 32. Flow path 31 has its entrance in first part 30a of fir tree 30.

Thus, two internal flow paths 31, 32 are available within the heat shield 28—one (32) for the low pressure low temperature air and a second bore (31) that directs the high pressure high temperature air for the blade (airfoil) cooling. While one segment of the rotor heat shield is shown, said heat shield could comprise a number of segments in one piece.

Characteristic features and advantages of the present solution are:
- Employment of two pressure sources to decouple the hot gas path cooling (of the blades and vanes specifically) from the cooling requirement of the rotor and the attachment (fir trees) of said blades and vanes to the rotor;
- The lifetime of the attachment areas, the fir trees, are highly dependent on the temperature and the load of the blades; enabling a reduced temperature at the fir trees allows for larger lifetime values, and a more robust product, that can operate under a wider range of operational configurations;
- The solution can enable rotor cooling without the requirement of an external cooler.

LIST OF REFERENCE NUMERALS 10,10a-c gas turbine
11,11a-c rotor
12 combustor
13,13a,b turbine vane carrier (TVC)
14 casing
15,15a-c turbine
16,16a,b (first) vane
17,17a-c (first) blade
18 low pressure (LP) cooling air channel
19 cooling air vent
20a-c compressor
21a-c low pressure (LP) cooling air channel
22a-c high pressure (HP) cooling air channel
23a,b pre-swirler
24a,b branch
25a,b branch
26a,b (second) blade
27a,b cavity
28 heat shield
29 body
30 fir tree
30a,b fir tree section
31,32 flow path (bore)
33 slant
34a,b vane heat shield
35 machine axis
36 airfoil
37 blade root (e.g. fir tree)
38 radial turbine
A,B cooling system
LA leakage air
HCA high pressure cooling air
LCA low pressure cooling air

The invention claimed is:

1. A method for cooling a gas turbine, the gas turbine including a compressor, a turbine, and a rotor, the method comprising:
   passing a first flow of cooling air through a high pressure cooling air channel that extends from an exit of the compressor;
   passing the first flow of cooling air, after the first flow of cooling air has passed through the high pressure cooling air channel, to a first bore of a heat shield provided on the rotor opposite to a plurality of stationary vanes of the turbine, thereby cooling the heat shield;
   cooling airfoils of rotating blades of the turbine using the first flow of cooling air after the first flow of cooling air has passed through the first bore of the heat shield;
   passing a second flow of cooling air through a low pressure cooling air channel that is connected to the compressor at a location that is upstream from the exit of the compressor and, as the second flow of cooling air passes through the low pressure cooling air channel, cooling the rotor using the second flow of cooling air;
   passing the second flow of cooling air to a second bore of the heat shield after the second flow of cooling air has passed through the low pressure cooling air channel, thereby further cooling the heat shield, wherein the heat shield is connected to the rotor via a first fir tree part and a second fir tree part, the first fir tree part and the second fir tree part being separated by a gap, wherein passing the second flow of cooling air to the second bore comprises passing the second flow of cooling air through the gap and into the second bore;
   cooling the blade roots of the rotating blades using the second flow of cooling air of the low pressure cooling air channel after the second flow of cooling air has passed through the second bore of the heat shield; and
   wherein the low pressure cooling air channel is separate from the high pressure cooling air channel and is positioned so that, in a radial direction, the low pressure cooling air channel is closer to a machine axis about which the rotor rotates than the high pressure cooling air channel, the second flow of cooling air passing through the low pressure cooling air channel has a temperature that is lower than a temperature of the first flow of cooling air passing through the high pressure cooling air channel, and the second flow of cooling air passing through the low pressure cooling air channel has a pressure that is lower than a pressure of the first flow of cooling air passing through the high pressure cooling air channel.

2. The method of claim 1, wherein the low pressure cooling air channel reduces a temperature of the cooling air passing therethrough.

3. The method of claim 1, wherein the compressor has multiple stages and the low pressure cooling air channel is connected to an intermediate stage of the compressor upstream of a last stage of the compressor, the exit of the compressor being in fluid communication with the last stage of the compressor.

4. The method of claim 1,
wherein cooling the rotor using the second flow of cooling air comprises cooling a drum of the rotor using the second flow of cooling air prior to the second flow of cooling air passing through the second bore of the heat shield.

5. The method of claim 1, further comprising:
using a radial turbine of the low pressure cooling air channel to reduce the temperature of the second flow of cooling air passing through the low pressure cooling air channel and to reduce the pressure of the second flow of cooling air passing through the low pressure cooling air channel prior to cooling the blade roots using the second flow of cooling air.

* * * * *